United States Patent

[11] 3,632,949

| [72] | Inventor | John Paul Thorne |
| | | Bay City, Mich. |
| [21] | Appl. No. | 849,469 |
| [22] | Filed | Aug. 12, 1969 |
| [45] | Patented | Jan. 4, 1972 |
| [73] | Assignee | Newcor, Inc. |
| | | Bay City, Mich. |

[54] DC CAN WELDER
10 Claims, 17 Drawing Figs.

[52] U.S. Cl..................................................... 219/64,
219/59, 219/67, 219/108, 219/131
[51] Int. Cl....................................................... B23k 31/06
[50] Field of Search............................................ 219/64, 59,
60, 61, 67, 103, 104, 108, 131

[56] References Cited
UNITED STATES PATENTS
| 2,086,306 | 7/1937 | Sessions.................. | 219/8.5 |
| 2,549,173 | 4/1951 | Cogan...................... | 219/59 |
| 2,886,691 | 5/1959 | Rudd........................ | 219/67 |
| 3,286,074 | 11/1966 | Lehnert et al............ | 219/131 |
| 3,496,327 | 2/1970 | Vilkas..................... | 219/131 X |
| 3,521,025 | 7/1970 | Opal........................ | 219/67 X |

Primary Examiner—J. V. Truhe
Assistant Examiner—L. A. Schutzman
Attorney—Woodhams, Blanchard and Flynn ABSTRACT: A method and apparatus for resistance lap welding a longitudinally extending seam on a metallic tubular element of relatively short (as for barrels, pails or cans) finite length utilizing a DC welding current and controlling same adjacent the leading and trailing edges to compensate for the change in current density thereat. The welded seam is then planished to render the weld joint smooth.

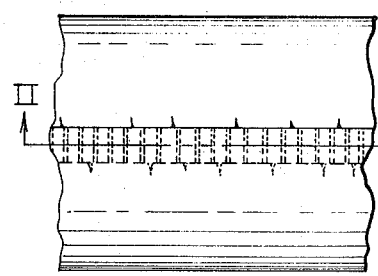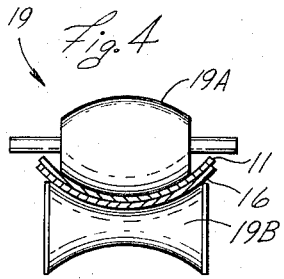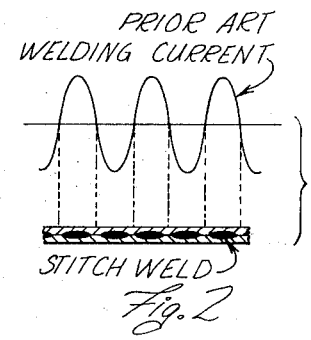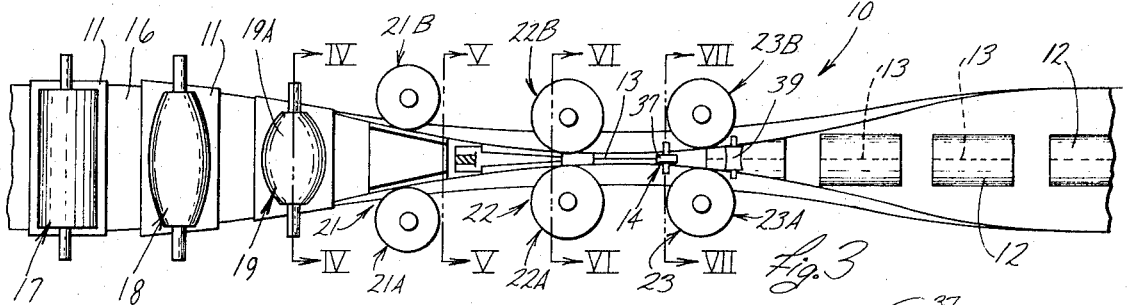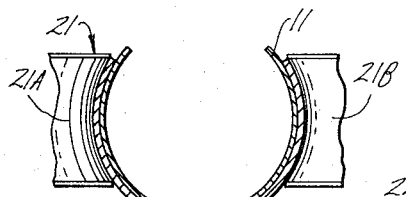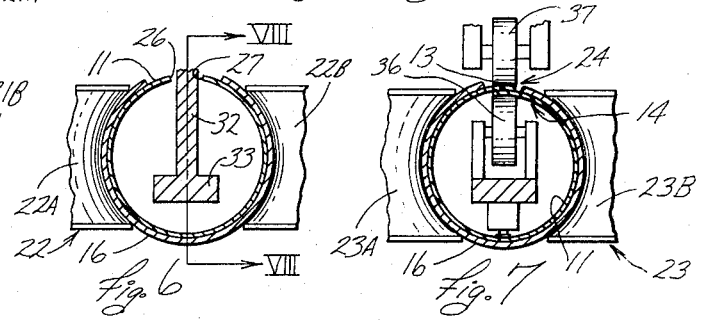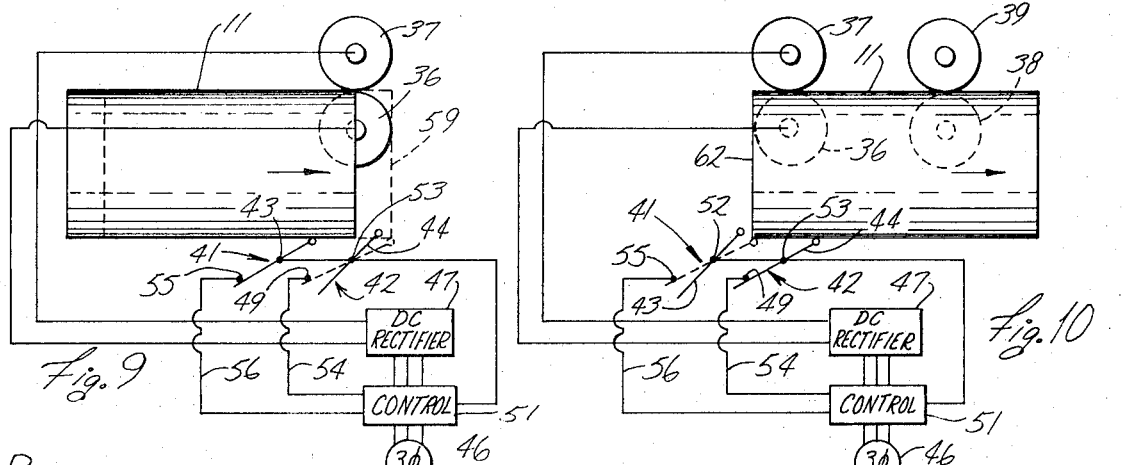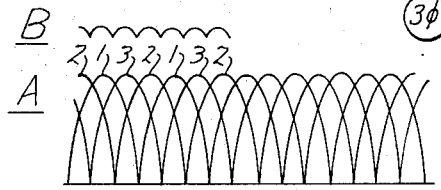

INVENTOR.
JOHN PAUL THORNE
BY
Woodhams, Blanchard & Flynn
ATTORNEYS 3,632,949

DC CAN WELDER

FIELD OF THE INVENTION

This invention relates to a resistance lap-welding method and apparatus and, more particularly, relates to a lap-welding method and apparatus for welding a continuous longitudinal seam on a tubular metal element, or blank, of relatively short finite length (as for barrels, pails or cans in contrast to the relatively long, or indefinite, lengths involved in welding tubing) utilizing DC welding current and controlling the current near the ends of the blanks to produce a continuous, uniform and smooth weld seam the full length of the metal element.

BACKGROUND OF THE INVENTION

In the production of containers for packaging, storing, selling and utilizing products of various kinds, including but not limited to food or drink for human or animal consumption, the use of sheet steel for same presents certain advantages of strength and low cost but also presents certain disadvantages. Among these disadvantages is the difficulty of providing a seam of fully satisfactory nature. From the standpoint of manufacturing speed and convenience, a resistance welded seam is attractive but when obtained by conventional practice, a welded seam often has fins or burrs thereon, particularly when welded with AC current in which the current peaks often overheat the metal and cause it to feather. This renders same unacceptable for many uses, particularly including the storing or marketing of food or drink products therein. Another disadvantage has been the difficulty of securing a solid and reliable weld for the full length of a can or barrel blank inasmuch as the concentration of current and/or heat at the respective ends of the blank would tend to overheat and "burn" the welded joint, which weakens or even destroys the weld at said ends. Thus, if the end of the blank is rolled in the forming of the can, the seam will often open. Attempts have been made to meet these problems by cutting both ends of the can blank to remove the portions thereof wherein the weld tends to be weak but this is wasteful of material. Other attempts to meet the problem have been met by soldering the seam but this, while effective, is expensive and eliminates much of the cost advantage obtained by using steel. Still other attempts to meet the problem have been met by diminishing the current at the leading end, or leading and trailing ends, of the container but when this is done with a conventional AC current supply, the control is either not accurate or it extends a distance farther from said leading edge than can be accepted. Particularly, such a control usually requires a full cycle of supply current at the initial low level before the current can be increased to the full welding value. With a random relationship between container position and cycles of current supply, this in many cases will result in more than a single cycle before the current level can change. Since the container is moving continuously, and often rapidly, this often makes the weld at the low level of initial current extend from the leading edge more than is desirable, hence, the leading edge is weak and will often split open when rolling thereof is commenced. Thus, to avoid such overrunning from the leading edge before the control can take effect, it is often necessary to run the containers through the welding equipment at a rate of speed considerably less than that at which the apparatus is otherwise capable of operating. In continuous, or at least long, tubing this problem presents no great difficulty for the weak leading and/or trailing ends can be cut off if desired. However, for relatively short items, such as cans, pails or barrels, such a solution is impractical.

The history of welding longitudinal seams in tubular elements dates back at least to the late 1890's. Many developments since then have indicated a recognition of the problems presented by the production of fins or burrs and such developments have included repeated attempts to produce a weld seam wherein the burrs would not be formed. However, such developments were generally unsatisfactory and in 1932 there appeared in Mitchell U.S. Pat. No. 1,863,313, issued June 14, 1932, a discussion of the early history of seam-welding problems. This history is reproduced below for convenience and while much or all of it deals specifically with such problems in connection with long tubing, it is also pertinent here:

"In the formation of tubes from ribbon stock by forming such stock into cylindrical form having a longitudinal seam and then welded, such seam (sic) to form the finished product, several well-defined methods are now commonly employed. The butt welding of the contiguous edges of the longitudinal seams of tubes is chiefly founded on the principles disclosed in the patent granted to Otto Parpart, U.S. Pat. No. 658,741, on Sept. 25, 1900. The employment of the Parpart apparatus results in a weld, the microscopic structure of the metal of which is uniform throughout the length of the welded seam. The chief disadvantages in the weld obtained by the use of the Parpart apparatus is that a relatively large fin or burr is formed on either side of the seam during the welding process, which fin or burr must be removed by an additional operation in order to produce a tube having a smooth finish both interiorly and exteriorly."

"For a considerable period of time the Parpart mechanism was used to weld tubing at a reasonable degree of speed with the undesirable fins or burrs formed on the tube during the welding process considered as a necessary evil to the attainment of welded tubes made at a relatively high speed. A further development in the art of welding tubing was evidenced by the patent granted to Johnston, U.S. Pat. No. 1,388,434, on Aug. 23, 1921, the apparatus disclosed in this patent being adapted to operate with a 60-cycle per second alternating current using from 12,000 to 15,000 amperes at 1½ volts. The weld accomplished by the Johnston apparatus is what is commonly known as stitch welding and which produces a seam having a relatively small burr or fin associated therewith, but which has the undesirable characteristic of not being a truly continuous weld. In the weld accomplished by the Johnston apparatus an actual welding of the contiguous edges of the tube occurs only at spaced intervals and the joining of the metal intermediately of the stitches is effected by the conductivity of the metal carrying the heat from the welded areas to the adjacent portions of the tube so that a joining of substantially the entire seam is effected."

"A further milestone in the development of the art of welding tubes occurred in the issue of the patent to Pancoast, U.S. Pat. No. 1,544,272, on June 30, 1925. The patent to Pancoast set forth an apparatus which in its basic principles of operation, was similar to the apparatus of Johnston. Pancoast, however, employed a high frequency current instead of the ordinary 60-cycle per second current employed by Johnston, and in using such high frequency current, brought the stitches comprising his welded seam closely enough together so that a welded seam resulted which was superior to the results obtained by Johnston. The product of the Pancoast apparatus, must still be considered as a stitch-welded seam having many of the undesirable features incidental in this type of welding. Pancoast likewise did not entirely get away from the formation of a burr or fin along the welded seam, which necessitated its removal by a separate operation subsequent to the welding."

"There are many uses to which welded tubing is applied which required that the welded seam be formed entirely free from any burr or fin, and also that the metal forming the welded seam be homogeneous throughout its longitudinal extent so that material such as acid contained in the tubing will not cause a failure of the welded joint."

"Regardless of the manner in which the stitch-welding process is carried on there are numerous possibilities for a failure of such apparatus in producing welds of the proper consistency throughout the length of the seam, and such failure will then cause a weak spot in the tubing which makes it unsatisfactory for use where a weld of superior quality is absolutely demanded. The weld accomplished by the Parpart apparatus had the proper characteristics, so far as the consistency of the material forming the weld was concerned, but had the formation of a burr along the seam necessarily caused with the formation thereof so that such tubing could not be used for a number of purposes."

The Mitchell patent (issued June 14, 1932) from which the foregoing history was taken, presented both a lap-welding device and a butt-welding device wherein the welding electrodes are moved into arcing relation with respect to a temporarily stationary tubular element to heat the tube to the welding temperature and then the electrodes are moved into upsetting relationship with respect to the seam to be welded. This patent contains a disclosure of the use of either DC or AC welding current. However, this process is time consuming due to the delay in heating the metal to the welding temperature and raises many problems of timing the movement of an assembly line of tubular blanks to be welded to maintain an even and steady flow of tubular elements through the apparatus.

Lutz, U.S. Pat. No. 1,865,530, issued July 5, 1932, discloses the lap welding of a longitudinal seam in tubular metal blanks wherein the weld joint is planished to produce substantially smooth interior and exterior surfaces along the weld seam. While this patent does not indicate the type of electrical current utilized in the production of its weld seam, the reference therein to U.S. Pat. Nos. 1,478,262 and 1,594,891 suggest, by the utilization of a transformer, that the welding current is AC. Thus, the weld produced with the Lutz device is similar to that produced by the previously discussed Parpart reference and a burr or fin is formed along the weld seam. Further, and more seriously, the stitch weld formed by AC current is not entirely satisfactory due to the spacings between the welds schematically illustrated in FIGS. 1 and 2 herein which unavoidably appear unless the blanks are run through the electrodes more slowly than is otherwise necessary. Thus, unless an undesirably slow speed is maintained, leaks can and often do develop thereby rendering the welded seam unacceptable for many uses.

Sessions, U.S. Pat. No. 2,086,306, issued July 6, 1937, provides an early recognition of the problem existing in the area of the leading and trailing edges of tubular elements having a finite length to be welded. The Sessions device is designed to reduce the speed of the tubular element past the welding electrode to thereby increase the time of heat application to certain portions of the metal such as, for instance, at the ends of the tubular element to compensate at least partially for what the inventor believed to be a reduced heating effect or rate of heating which may occur in those portions while they are passing through the heating or welding zone. However, the Sessions development has not been entirely satisfactory due to the problem generated by slowing down and speeding up the tubular element assembly line thereby making it impractical to increase the speed of the overall welding operation due to the creation of acceleration and deceleration problems.

In Cogan U.S. Pat. No. 2,549,173, there is shown a very successful machine for welding barrels or other containers by seam welding in which an AC current supply was used. In this machine, (however, not disclosed in the patent), as well as others known to the art, it was common to diminish the current supply at the leading edge of the container blank in order to avoid an excessive current density at said leading edge and consequent burning thereof. However, with the random relationship of said leading edge with the AC sine wave of the supply together with the fact that at least one full cycle of current at the lower initial value was necessary before the current control would raise same to the full welding value, and together with the further fact that a proper amount of distance for the initial current value to extend was often only a few thousandths of an inch, it often happened that the low value would extend longer than desired if the barrel moved at the proper welding speed for the capacity of the machine. Hence, there is either the risk of a burning or weakness at the initial edge of the barrel or insufficient welding for a greater distance from the leading edge of the barrel than desirable or the barrel had to be run at a slower speed than that which the machine was capable.

The problem recognized in the Sessions patent is again discussed in Kohler et al., U.S. Pat. No. 3,131,285 (1964) wherein the leading and trailing edges of tubular metal elements having a finite length are preheated by a high frequency electrical heating current to heat the edges of the seam up to a welding temperature upon their approach to a welding point at which point the metal portions are welded together under pressure to provide a longitudinally extending seam which is welded throughout from a point substantially at the forward end thereof and substantially to the trailing end thereof. However, the high frequency welding current produces a stitch weld which is disadvantageous for the well-known reasons discussed above.

Thus, though much attention has in the past been paid to the problem, there appears up to now to have been no satisfactory means developed for eliminating the formation of fins and burrs from resistance welded steel tubing nor has there been a satisfactory means developed for heating the leading and trailing edges of a tubular element having a finite length so that a good, sturdy, continuous and smooth weld is formed thereat. Thus, while sheet steel has been satisfactorily formed in tubing for a variety of purposes where the formation of fins and burrs is of no consequence and where the lengths are sufficiently long that a weak zone, seldom of more than 1 inch in length, at the ends of the tubing can be cut off with no appreciable loss of material, and steel welded with AC current has also been used for barrels where a leading edge weakness or slow welding speed can be accepted, such methods of forming cylindrical shapes from sheet steel has been, and at the present has remained, wholly unsatisfactory for high-speed forming of containers for such uses that the presence of burrs and feathering cannot be accepted, for the forming of relatively short cylindrical objects, such as cans or barrels, where one or both ends thereof are to be rolled or otherwise processed in such a manner as to put a substantial strain on the welded seam, or for forming cans or barrels where a potential leak anywhere along the seam thereof cannot be tolerated. It is emphasized that such items as cans, pails and barrels have in the past been made by AC resistance welding but that for the reasons above explained such procedures have been relatively slow. Hence, the use of steel cans for packaging a variety of products, particularly products for human internal consumption, has suffered in favor of containers made from other materials, such as aluminum, plastic or glass. However, if a method and means could be advised by which the rate of welding could be increased with the resulting weld still being continuous, smooth and of uniform strength throughout the full length of the blank, a large market could be opened for the use of steel in such containers, which market is now closed. As has been amply demonstrated above, this situation and problem have long been recognized and many attempts have been made in the past to remedy same but insofar as I am aware, without complete success excepting at lower welding speed up to the advent of the present invention.

Accordingly, it is an object of this invention to provide a method and apparatus which produces a satisfactory weld seam in tubular elements having a relatively short finite length, such as cans or barrels as distinguished from tubing, which weld seam is smooth and free of burrs or fins so that same can be utilized in the production of containers which are smooth both internally and externally, such as for holding food materials.

A further object of the invention is to provide a method and apparatus, as aforesaid, by which the rate of welding of such articles, as aforesaid, can be substantially increased over previous practice without damage to the quality of the resulting weld.

It is a further object of this invention to provide a weld seam which is continuous along the length of the tubular element so that the likelihood of leaks forming in the longitudinal weld seam is minimized.

It is a further object of this invention to provide a weld seam by use of DC current so that the modification of the current at the leading edge of a container may be made at any point desired from the leading edge of the container, whereby to increase the speed of welding while at the same time controlling accurately the current density at the leading edge of the container blank and at all points following said leading edge.

A further object of the invention is to provide a method and apparatus, as aforesaid, which by use of a DC current derived from a three-phase, doublt-rectified source for effecting the welding operation will substantially reduce the demand on the supply lines.

It is a further object of this invention to provide a weld seam, as aforesaid, on a tubularly steel container which is acceptable to meet government inspection agency requirements for the making of metal, including steel, food containers.

SUMMARY OF THE INVENTION

The objects and purposes of the invention are met by providing a method and apparatus for welding longitudinally extending seams on a metallic tubular element of finite length by utilizing a generally tubular conveying and holding means for carrying a plurality of the elements in spaced relation and in succession and means for longitudinally and continuously advancing the conveying and holding means together with the plurality of elements and for subjecting each element to pressure at opposite sides of a longitudinal weld seam whereby the edges of a longitudinal gap in the element are brought together and overlapped under pressure and heat at the weld line. The welding operation is accomplished by utilizing the following steps and components:

a. providing DC welding current supply means and electrode means engageable with at least a portion of the opposite sides of the overlapped joint of the element and supplying DC welding current from the DC weld current supply means to the overlapped joint, the longitudinal advancing means moving the element past the electrode means;

b. programming control means for causing the weld current supply means to supply current at a first, usually progressively increasing, magnitude to the weld seam at the beginning thereof, at a second, usually steady, magnitude of a value greater than at at least the leading end of the element for a distance from a first point at the end of the first magnitude to a second point at or near the trailing end of the element and, if desired, a third, usually progressively diminishing, magnitude from said second point to the trailing end of the element.

c. applying means for planishing the weld formed by the weld current passing through the weld line to render the weld joint smooth and of thickness as desired.

Alternatively, though less desirably, the first and third currents, which may be of equal or dissimilar values with respect to each other as desired, are stepwise, instead of progressively, related to the current of the above-mentioned second magnitude.

Other objects and purposes of this invention will be apparent to persons acquainted with welding apparatus of this general type upon reading the following specification and inspecting the accompanying drawings, in which:

FIG. 1 is a top-elevational view of a prior art seam weld;

FIG. 2 is a sectional view taken along the line II—II of FIG. 1;

Figure 8:
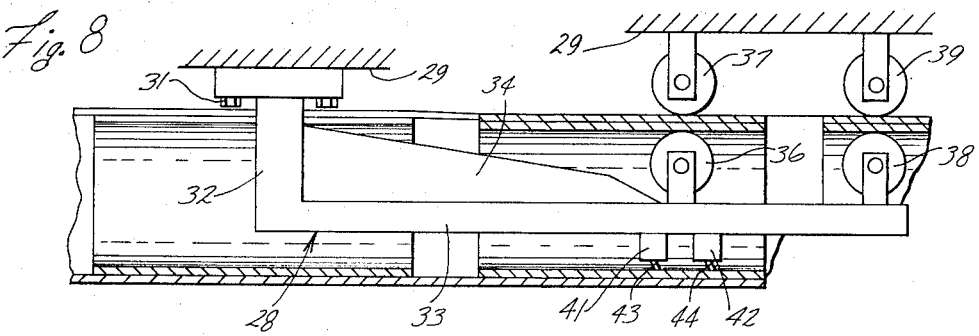
Figure 12:
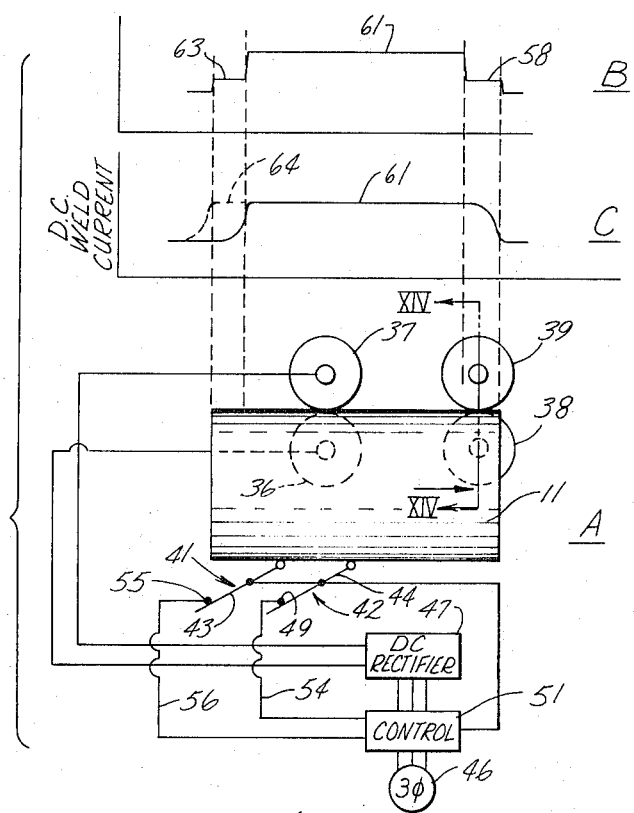
Figure 13:
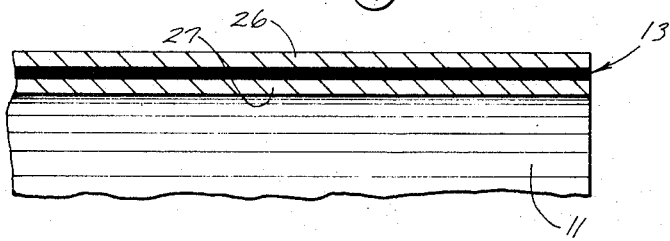
Figure 14:
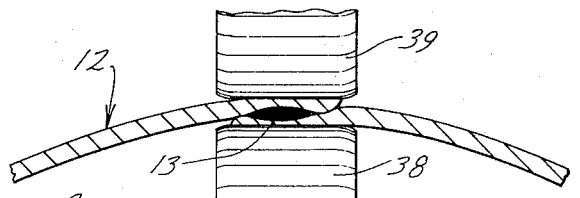

FIG. 3 schematically illustrates a form of conventional apparatus usable with the invention for (1) welding a series of tubular elements in succession while same are carried by a continuous belt arranged to shape the elements to have a closed, usually circular, cross section, and (2) for embracing the workpieces and forming and holding them in the desired cross-sectional shape with the edges of the seam being overlapped while same are passed through the welding apparatus and releasing same thereafter;

FIG. 4 is a sectional view taken along the line IV—IV of FIG. 3;

FIG. 5 is a sectional view taken along the line V—V of FIG. 3;

FIG. 6 is a sectional view taken along the line VI—VI of FIG. 3;

FIG. 7 is a sectional view taken along the line VII—VII of FIG. 3;

FIG. 8 is a sectional view taken along the line VIII—VIII of FIG. 6;

FIG. 9 is a schematic illustration of the welding current control device for controlling the welding current to the welding electrodes when same are adjacent the ends of the tubular elements;

FIG. 10 is a schematic illustration similar to FIG. 9 but with the tubular elements moved longitudinally of the welding electrodes and being engaged by the planishing rolls;

FIG. 11A is a drawing of the voltage applied to the rectifiers in one typical apparatus embodying the invention;

FIG. 11B is a drawing of the welding current wave form produced by the DC rectifier;

FIG. 12A is a schematic illustration similar to FIGS. 9 and 10 but showing the average magnitude of one pattern of the DC weld current in its relation to the length of the tubular elements;

FIG. 12B is similar to FIG. 12A but showing a different pattern of welding current;

FIG. 13 is a sectional view taken along the weld seam of a welded tubular element to illustrate the continuity of the weld seam produced by the DC welding current; and FIG. 14 is a sectional view taken along the line XIV—XIV of FIG. 12.

Certain terminology will be used in the following description for convenience in reference only and will not be limiting. The words "up," "down," "right" and "left" will designate directions in the drawings to which reference is made. The words "leading" and "trailing" will have reference to the right and left edges, respectively, of the blanks illustrated in FIGS. 3, 8, 9, 10 and 12. The words "in" and "out" will refer to directions toward and away from, respectively, the geometric center of the device and designated parts thereof. Such terminology will include derivatives the words of similar import.

DETAILED DESCRIPTION

FIG. 3 illustrates a conventional conveying and holding apparatus 10 for conveying a plurality of sheet metal blanks 11 which are to be bent in a manner to define a tubular element 12 welded along a longitudinal seam 13. The conveying and holding apparatus 10 is illustrated only to show a device which is suitable for supplying a continuous succession of spaced-apart workpieces to a welding zone 14 while simultaneously bending the blanks 11 into a tubular shape for presentation to the welding zone. Said apparatus 10 forms, however, no part of the present invention and may be of any of many forms, such as that shown in the U.S. Pat. to Cogan No. 2,549,173 or that shown in the U.S. Pat. to Kohler No. 3,131,285. The conveying and holding apparatus of FIG. 3 is taken solely for illustrative purposes from said U.S. Pat. to Kohler et al. No. 3,131,285 and a brief summary of same will be presented hereinbelow for convenience.

The conveying and holding apparatus 10 comprises an endless-type flexible belt 16 which moves the blanks 11 in a direction from left to right as appearing in FIG. 3. Suitable means are provided, such as the roller pairs 17, 18 and 19 for curving the blanks 11 into an arcuate form. The sheet metal blanks 11 may be held initially in contact with the belt 16 as by suitable upper and lower pressure rollers, one pair 19A and 19B of which are best illustrated in FIG. 4.

Other suitable roller pairs 21, 22 and 23 are provided for curling the curved metal blanks 11 into a generally cylindrical form as illustrated in FIG. 5–7. The rollers 23A and 23B (FIG. 7) are oriented so that the edges 26 and 27 of the metal blank 11 become overlapped as at 24 along the longitudinal edges thereof to define the longitudinal seam 13 which is to be welded. Further details of the conveying and holding apparatus 10 are discussed in the above-mentioned Kohler et al. patent and reference may be had thereto.

An arm 28 (FIG. 8) comprises a vertically extending leg 32 which is secured to a frame 29 in any suitable manner, such as by a plurality of screws 31, and which extends downwardly between the longitudinal edges 26 and 27 (FIG. 6) of a metal blank 11 prior to an overlapping of same as illustrated in FIG. 7. The arm 28 further comprises a horizontally extending leg 33 which is fixedly secured to the lower end of the vertical leg 29 and extends rightwardly away therefrom generally through the central portion of the cylindrically formed metallic blank 11. The leg 33 may be rigidified, if desired, by a gusset member 34.

A roller-type electrode 36 is rotatably supported on the leg 33 intermediate the length thereof and is positioned to engage the underside of the overlapped edges 24 of the cylindrically formed metallic blank as illustrated in FIG. 7. A corresponding roller-type electrode 38 is secured to the frame 29 in any convenient manner so that it is radially aligned, spaced above the roller electrode 36 and backed by suitable pressure creating means (not shown) in any conventional manner. Thus, the edges 26 and 27, when they pass between the electrodes 36 and 37, will be urged together to complete an electrical circuit between the electrodes.

A planishing roll 38 is secured to the leg 33 adjacent the right end thereof and is positioned to engage the weld seam 13 of the newly formed tubular element 12. A second planishing roll 39 is rotatably secured to the frame 29 and is radially aligned with the planishing roll 38. A suitable force urging said planishing rolls together is provided in a conventional manner, the magnitude of said force being chosen and controlled (as in U.S. Pat. to Bach No. 3,119,289 and art cited therein) so that when the welded seam 13 passes between the planishing rolls 38 and 39, the overlapped joint 24 will be squeezed together as illustrated in FIG. 14 whereby the overall thickness thereof is reduced as desired, usually to a little more than the thickness of the remainder portion of the wall of the tubular element 12.

In this particular embodiment, normally open switches 41 and 42 are secured to the underside of the leg 33 and the actuator arms 43 and 44 thereof, respectively, are positioned to engage the leading and trailing edges of the metal blank as same move rightwardly past the welding electrodes 36 and 37. In the drawings, said switches are for convenience indicated as mechanical switches actuated by contact with the blank 11. Preferably, however, for obvious reasons, said switches will be of noncontacting nature, such as proximity switches, fluidic switching devices or photo devices.

Referring now to FIG. 9, a three-phase alternating current supply 46 provides three-phase alternating current to a suitable heat control device 51. Said control 51 is of any conventional type (as phase shift) and is arranged in any convenient manner to initiate and effect a control function on either the positive or negative pulses of all three phases. Since a heat change signal received at any given time will with conventional controls take effect on the next following wave front, such a heat change signal with this arrangement has 360-wave fronts per second on which to take effect as contrasted with the 60-wave fronts per second in the AC system of the prior art.

The control is then connected to a DC rectifier 47 which changes the alternating current to a DC current having a wave form similar to that illustrated in FIG. 11B. The output of said rectifier is supplied to the welding electrodes 36 and 37 in any convenient manner. One side of the control 51 is connected at 53 to the armature of switch 42 and also at 43 to the armature of switch 41. The contacts 49 and 55, respectively, of said switches are connected independently to the other side of said control 51. The internal arrangements of the control, in any of several well-known ways, are such that when the actuator members or armatures of both switches 41 and 42 are closed the welding current supplied to the welding electrode 37 has a higher magnitude than when either of said switches is open.

OPERATION

The operation of the device embodying the invention will be apparent to skilled persons but a summary thereof is now given for convenience.

The endless belt 16 moves each of the metal blanks 11 through the apparatus and past the rollers 17-19 to change the metal blanks 11 from a flat rectangular condition to a curved form generally indicated in FIG. 4. The speed of such feeding of the blanks will usually be at least about 30 f.p.m. and will often be as high as 150-200 f.p.m. As the belt 16 further progresses the blanks 11 toward the welding electrodes 36 and 37, the rollers 21-23 engage the exterior of the belt 16 and form the blank 11 into a circular cross section so that by the time the blank 11 is in the position illustrated in FIG. 7, the rollers 23A and 23B urge the longitudinal edges 26 and 27 into an overlapped condition as at 24 in FIG. 7 to define the longitudinal seam 13. The opposite sides of the longitudinal seam 13 are engaged by the welding electrodes 36 and 37 as illustrated schematically in FIG. 9. In this condition, the switches 41 and 42 are in the positions illustrated in FIG. 9 and the control 51 is thereby energized to a first magnitude condition and thereby cause the rectifier to supply a relatively low DC welding current from the rectifier to the electrodes 36 and 37. The low magnitude of the DC welding current is generally indicated at 58 in FIG. 12B and is selected and controlled to compensate for the otherwise high-current density adjacent the leading end of the blank 11. Particularly, in the zone of a seam weld spaced from the ends of the part being welded, current tends to shunt through the weld just made and the heat tends to run ahead of the weld point. However, at the leading edge of the part there is no such shunt path and the current tends to concentrate at the edge and thus increases the current density at same. At the trailing edge the tendency of the heat to run ahead of the weld point is stopped and the heat tends to concentrate at the trailing edge. In either case, there is a tendency to overheat the weld zone at both the leading and trailing ends of the workpiece and a reduction of current at such ends is desirable to compensate for such tendency.

When the leading edge 59 of the now generally tubular blank 11 reaches the broken line position illustrated in FIG. 9, the switch 42 is closed and the control 51 activated to cause the rectifier to supply a higher, or second magnitude, DC welding current to the welding electrodes 36 and 37. This magnitude differential is best illustrated at 61 in FIG. 12B and is selected according to the welding job to be carried out. As a typical example, the current of first magnitude indicated at 58 in FIG. 12B may be of from 7,500 to 10,000 amperes and the current of second magnitude indicated at 61 is of from 15,000 to 20,000 amperes, although currents of 15,000 amperes and 30,000 amperes, respectively, are also sometimes used.

The conveying and holding apparatus 10 further conveys the blank 11 past the welding electrodes to the position generally illustrated in FIG. 12A wherein the planishing rolls 38 and 39 engage the now welded seam 13 to squeeze same to the desired thickness, such as a thickness equal to, or slightly greater than, the thickness of the wall of the blank 11 as illustrated in FIG. 14.

The element 11 will continue to move past the electrodes 36 and 37 and the planishing rolls 38 and 39 until the trailing end 62 of the blank 11 is in the position illustrated in FIG. 10. In this position, the switch 41 will open and thereby return the control 51 to its first magnitude condition above mentioned to again reduce the DC welding current to the low value as schematically illustrated at 63 in FIG. 12B. Accordingly, a reduction in the current flow adjacent the trailing edge of the element is effected which will bring about the production of a satisfactory weld.

If, for example, the conditions at the trailing edge permit, as with thick gauge metals, the switch 41 may be deactivated leaving the armature 43 permanently in contact with the terminal 56. Thus, the second, or high, magnitude of welding current 61 will continue to flow through the weld seam until the trailing edge of the blank passes the armature 44 of the switch 42.

A further movement rightwardly of the belt 16 will move the tubular elements 12 from the planishing rolls to a disposition point (not shown) so that the belt 16 may be returned to a position where a new metal blank 11 is placed thereon so that the foregoing procedure can be repeated.

It will be appreciated that with the control connected to the AC supply, conventional control means can be used, while the use of DC welding current makes it possible to cause a modification of the welding current to take place virtually at will. Thus, even though the relationship of the position of a given blank to the sine waves of the supply is purely random, a very accurate control can be maintained over the extent of the zones 58, 61 and 63 in whatever combination same are used, in relation to the speed of travel of the blanks 11. Thus, in one actual embodiment a speed of travel of the blanks of about 200 f.p.m. was attained as compared to a speed of travel of the blanks of 50 f.p.m. for AC equipment of otherwise corresponding characteristics with, at the same time, a materially improved weld.

Thus, the welding current may be automatically adjusted at both the leading and trailing ends of the cam blank to insure a solid weld throughout the length thereof, a DC current has been used throughout the length of the seam in order to insure the obtaining of a high speed, but continuous, weld throughout the length thereof and the welding seam has been planished to render same smooth and of the desired thickness. In this way, there is obtained a can blank which is smooth throughout and capable of being made into a can for the safe reception of products for human internal consumption and the seam of the blank is of sufficiently uniform and reliable strength throughout that the blank can be further processed into a can by normal methods including the rolling of one or both ends thereof without breaking open or otherwise weakening the welded seam and yet the welding operation has, if desired, been carried out at a higher speed than is the case with welders known prior hereto.

While the foregoing described and illustrated embodiment assumes that the welding current will change stepwise from the beginning zone 58 (FIG. 12B) to the beginning of midzone 61 and change again stepwise from the end of midzone 61 to the trailing zone 63, it will be evident that it will be fully within the scope of the invention, and somewhat more accurate from the standpoint of obtaining as perfect a weld as possible, to cause the welding current to rise progressively at a predetermined, controlled, rate rather than stepwise from the commencement of the blank to the beginning of midzone 61 and to decrease progressively from the end of the midzone 61 to the trailing edge of the blank. Any of several well-known current controlling means properly synchronized with the beginning end of the blank may be utilized for this purpose. A preferred pattern of weld current for such arrangement is illustrated in FIG. 12C, the solid line illustrating the preferred situation where the weld current is diminished at both the leading and trailing ends of the blank and the broken line illustrating the current where the current is maintained at the second magnitude to the trailing end of the blank.

While the foregoing has assumed and is based on the supply of a steady DC welding current to the welding electrodes, and such is the preferred form of the invention, it will be recognized that the major objective of the invention will be accomplished by supplying, instead of pure DC current to the welding electrodes, a current which only substantially approximates a pure DC current. Thus, for most practical purposes, such as the welding of cans or barrels at a rate which is economically acceptable, it will be satisfactory if the current supply is from a three-phase double-rectified supply system, such as that illustrated by the diagram of FIG. 11A, whereby the actual welding current will be slightly rippled as indicated in FIG. 11B. In this case the increments by which the welding current can be controlled are still sufficiently small that relatively high-welding speeds can be attained with the controls still being effective within a few thousandths of an inch from the leading edge of the container blank and further without the high peaks of ordinary AC current which in AC welding causes the burrs and feathers above mentioned. Thus, in the hereinafter appended claims, the term "DC current" will be interpreted to include that having a slight ripple therein as well as that which is of absolutely constant magnitude.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. Apparatus for resistance welding longitudinally extending seams on a metallic tubular element of finite length and initially having a longitudinal gap therein, conveying and holding means for carrying a plurality of said elements in spaced relation and in succession and means for longitudinally and continuously advancing said plurality of elements and for subjecting each element to pressure at opposite sides of a longitudinal weld line, whereby the edges of the longitudinal gap in said element are brought together and overlap under pressure at the weld line, comprising:

electrode means engageable with at least a portion of the opposite sides of the overlapped joint of said element and adapted to apply a weld pressure at the weld line;
   an AC supply;
   DC weld current means connected in circuit with said electrode means and adapted to supply DC welding current having first and second magnitudes to said overlapped joint;
   welding current control means connected in electrical circuit with said AC supply and adapted to be responsive to the position of said element relative to said electrode means to cause said DC weld current means to supply one of said first and second magnitudes of DC weld current to said electrode means as a function of the position of said element relative to said electrode means, said weld current control means including first switching means for effecting a supply of said first magnitude of said DC weld current sufficient to create a fusion of metal along said weld line between one of the end edges of said element and a point spaced inwardly therefrom a predetermined length but insufficient to cause a large concentration of weld heat along said predetermined length to effect an overheating of the fused joint, said weld current control means including second switching means for effecting a supply of said second magnitude of DC weld current sufficient to create a fusion of metal along said weld line between said predetermined lengths at opposite ends of said elements.

2. A method for welding a longitudinally extending seam on relatively short metallic tubular elements initially having a longitudinal gap therein, comprising the steps:

a. providing an AC power supply;
   b. conveying a succession of said elements in random relationship with said AC supply through guiding and forming means to bring the edges defining the longitudinal gap together and overlap same under pressure along the line to be welded;
   c. contacting the leading end of each successive element with welding electrodes and causing a relative movement between said electrodes and said seam from the leading edge along said seam to the trailing edge thereof and applying a DC welding current by means of said electrodes to said seam; and
   d. controlling the magnitude of said welding current in close relationship to the position of said successive elements relative to said electrodes and substantially independently of the sine waves of said AC supply to:
      1. supply welding current at a first value from the leading edge of each successive element to a first point at a closely predetermined distance from said leading edge, said first value of welding current being sufficient to create a welded joint along said weld line between said leading edge and said first point but insufficient to cause a large concentration of weld heat to thereby prevent an overheating of said welded joint, 2. cause said welding current to rise to a second value at said first point spaced from the leading edge of said element, said second value of welding current being sufficient to create a welded joint along said weld line, 3. maintain said welding current substantially uniform from said first point at least to a second point at a closely predetermined distance ahead of the trailing end of said blank, and 4. continue said welding current from said second point to the trailing end of said blank at one of said first and second magnitudes sufficient to create a welded joint along said weld line but insufficient to cause a large concentration of weld heat to thereby prevent an overheating of said welded joint.

3. Apparatus according to claim 1, wherein said first magnitude of said welding circuit is less than said second magnitude thereof.

4. The method of claim 2, wherein the current from said second point to the trailing end of said blank is diminished with respect to said second value.

5. The method defined in claim 2, wherein the change in current from the leading edge to said first point is stepwise.

6. The method defined in claim 2, wherein the change in magnitude of weld current between the leading edge and said first point is progressive at a predetermined rate.

7. The method defined in claim 2, wherein the change in magnitude of weld current from said second point to said trailing edge is stepwise.

8. The method defined in claim 2, wherein the change in magnitude of weld current from said second point to said trailing point is progressive at a predetermined rate.

9. Apparatus according to claim 1, including means for planishing the weld formed by said current passing through said weld line to render the weld joints smooth.

10. The method according to claim 2, including the step of planishing the weld area to render the weld joint smooth.

* * * * *